UNITED STATES PATENT OFFICE.

EBER B. C. WRIGHT, OF CHARLES CITY, IOWA.

MEDICAL COMPOUND FOR RHEUMATISM, &c.

SPECIFICATION forming part of Letters Patent No. 266,573, dated October 24, 1882.

Application filed May 15, 1882. (No specimens.)

*To all whom it may concern:*

Be it known that I, EBER B. C. WRIGHT, of Charles City, in the county of Floyd and State of Iowa, have invented a new and useful Improvement in Medical Compounds; and I do hereby declare that the following is a full, clear, and exact description of the same.

My invention is an improved compound for the treatment of rheumatism, erysipelas, paralysis, salt rheum, and scrofula.

It consists of the following ingredients, mixed and compounded in the proportions hereinafter specified: I take of the fluid extract of poke-root one ounce, of the compound extract of sarsaparilla one ounce, half-ounce resin guaiaci, one ounce of the English wine of colchicum, one-quarter ounce iodide of potassium, and two and one-quarter ounces of alcohol. Of these ingredients, in the proportions named, I give ordinarily a tea-spoonful three times a day until the patient is cured.

I am aware that the compound extract of sarsaparilla has been used in medicine with potassium iodide; and I am also aware that the medicinal virtues of poke-root have been known and employed. I do not therefore claim these ingredients, knowing that their use separately is old; but

What I claim as my invention, and desire to secure by Letters Patent, is—

A medical compound composed of compound extract of sarsaparilla, fluid extract of poke-root, gum-guiacum, iodide of potassium, English wine of colchicum, and alcohol, combined in about the proportions described.

In testimony whereof I have signed my name to this specification in the presence of two subscribing witnesses.

EBER B. C. WRIGHT.

Witnesses:
W. H. JENKINS,
C. W. MANN.